United States Patent [19]
Crochet et al.

[11] Patent Number: 5,924,672
[45] Date of Patent: *Jul. 20, 1999

[54] VALVE AND ACTUATOR IN COMBINATION

[75] Inventors: Kevin Crochet, Metairie; Edward A. Sentilles, III, Lacombe, both of La.

[73] Assignee: Provacon, Inc., Reserve, La.

[*] Notice: This patent is subject to a terminal disclaimer.

[21] Appl. No.: 08/944,877

[22] Filed: Oct. 6, 1997

Related U.S. Application Data

[63] Continuation-in-part of application No. 08/402,915, Mar. 13, 1995, Pat. No. 5,673,897.

[51] Int. Cl.$^6$ .......................... F16K 31/122; F16K 27/12
[52] U.S. Cl. .................. 251/63.6; 92/62; 92/65; 105/377.07; 137/244; 137/382; 137/614.11; 141/348; 251/144; 251/214; 251/332; 251/333; 251/335.3
[58] Field of Search .......................... 251/62, 63.5, 63.6, 251/335.3, 144, 214, 332, 333; 92/151, 62, 65; 137/242, 244, 302; 105/377.07; 141/347, 348

[56] References Cited

U.S. PATENT DOCUMENTS

| | | | |
|---|---|---|---|
| 2,901,888 | 9/1959 | Swift | 92/151 |
| 3,152,607 | 10/1964 | Lundeen | 137/164.11 |
| 3,554,088 | 1/1971 | Bruyn | 91/411 |
| 4,585,207 | 4/1986 | Shelton | 251/62 |
| 4,934,652 | 6/1990 | Golden | 251/63.6 |
| 5,673,897 | 10/1997 | Crochet et al. | 251/63.6 |

*Primary Examiner*—George L. Walton
*Assistant Examiner*—Bryan Wallace
*Attorney, Agent, or Firm*—Roy, Kiesel & Tucker, PLC

[57] ABSTRACT

A valve and actuator in combination with a transportation tank to operate off of low pneumatic pressures including a valve having a valve body with a tank end, a valve seat near the tank end of the valve body, the valve seat having a valve sealing surface; a stem chamber extending through the valve body, the stem chamber having an actuator port, a seat port, and an outlet port; a valve stem slidably positioned in the stem chamber, the valve stem having a plug end and a plug attached to the plug end, the plug having a plug sealing surface to sealingly contact the valve sealing surface; an actuator having a hollow housing with a valve end, the valve end attached to the valve body; a plurality of piston assemblies, each having a piston slidable in the housing and a partition fixed in the housing, the piston and the partition defining an actuator chamber; piston spacers joining the pistons so that each piston is fixed in position with respect to the others; the pistons being operatively joined to the valve stem; a helical coil for generating a biasing force to bias the plug sealing surface against the valve seat sealing surface thereby closing the valve; and a passage for introducing pressurized fluid into the actuator chambers so that the pressurized fluid exerts a force against the pistons sufficient to overcome the biasing force to open the valve.

20 Claims, 9 Drawing Sheets

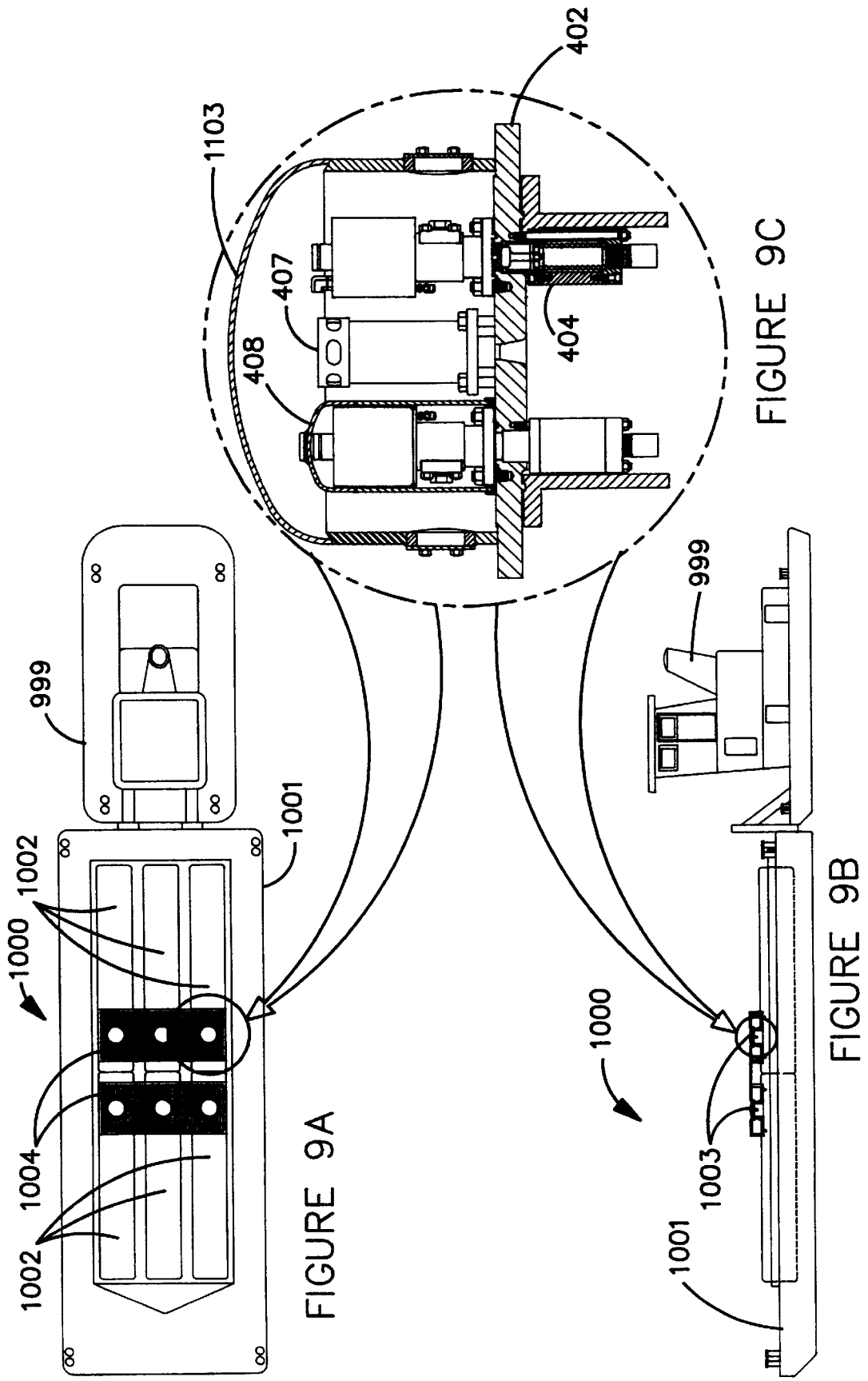

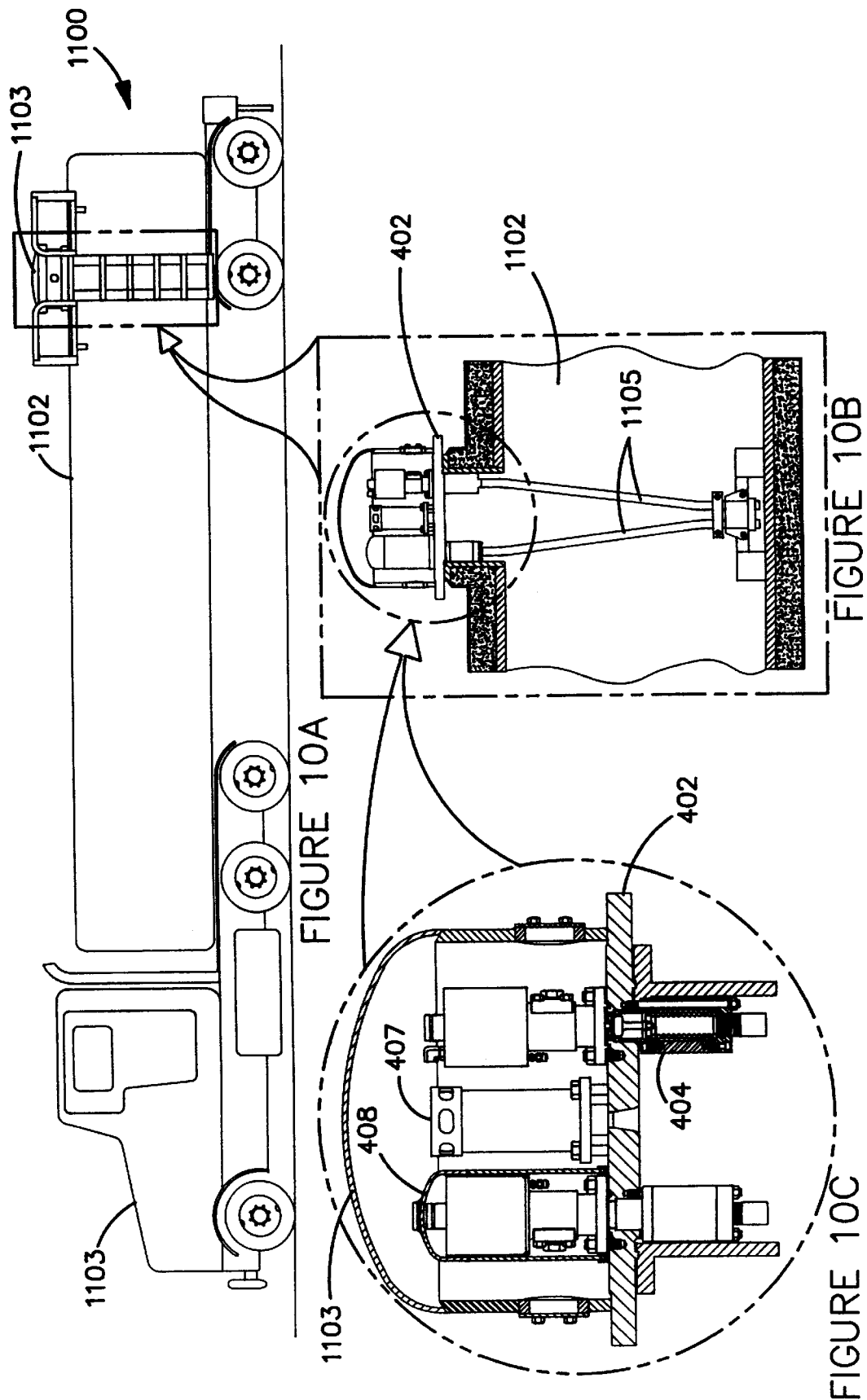

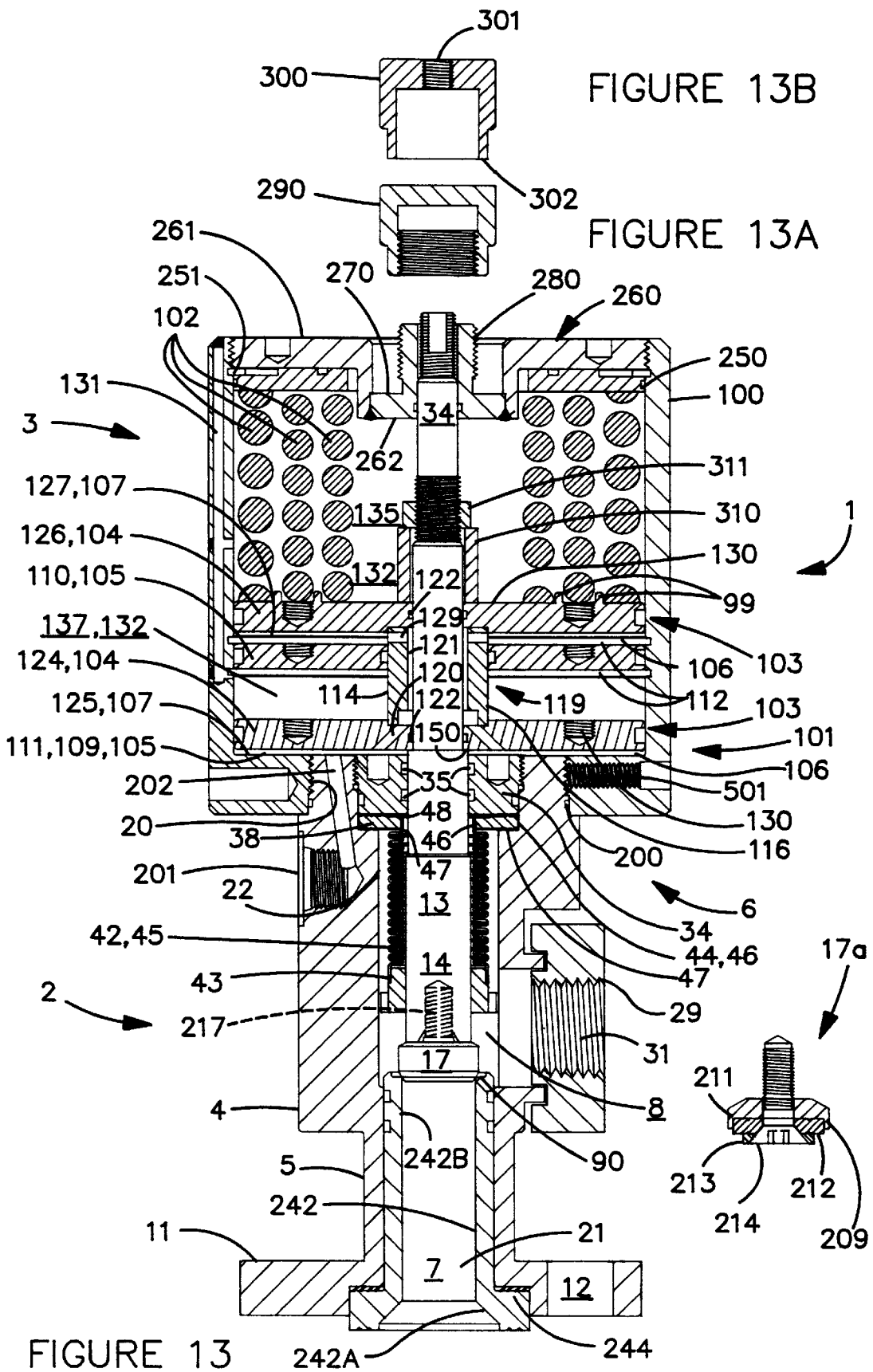

VALVE AND ACTUATOR IN COMBINATION

This is a continuation-in-part of application Ser. No. 08/402,915 filed on Mar. 13, 1995 now U.S. Pat. No. 5,673,897.

DESCRIPTION

1. Technical Field

This invention relates to valves and actuators in combination, and more particularly, to pneumatically operated piston actuators and globe valves in combination for use in tankers for transporting hazardous materials where available pneumatic pressures are as low as 60 psi.

2. Background Art

Valves and actuators for tanker railway cars are subject to severe limitations due to standards imposed by various governing bodies, such as The Chlorine Institute and the American Association of Railroads. For instance, a valve and actuator in combination must be attachable to the industry standard manway cover which covers the openings in the tanker railcar or otter transport vehicles, such as a river tank barge or highway trailer tanker. Additionally, a valve actuator combination is needed for ISO storage transport tanks, to minimize leaks during tie loading and off loading processes. The standard manway provides for the attachment of four valves; two for liquids and two for gasses, and is a common feature on all applications. Further, all four valves must fit within the confines of the dome covering the manway. A more restrictive requirement is that each individual valve/actuator in combination must be sized to fit within the confines of an industry standard emergency hood, generally a cylindrical space of height 13.5 inches with radius of 3 inches. The emergency hood is a device for sealing one of the four valve/actuator combinations attached to the manway. In this fashion, a leaking valve can be isolated without removing the tanker railway car from service and without the need to remove the defective valve until the car is scheduled for maintenance. Another restriction is that access to the valves is provided by standard sized openings in the tanker dome. If the valve/actuator cannot be accessed through the standard opening, it would be necessary to remove the railcar dome for access.

A restriction pertinent for the use of pneumatically operated actuators is that the generally available house pressures for operation of the valves can be as low as 60 psi. For many types of materials transported by tanker vehicles, these pressures, with the currently used single piston actuators, are insufficient. When transporting hazardous or toxic materials, such as chlorine, it is desirable to have the biasing force, which maintains the valve in the normally closed position, as great as possible. In general, the greater the biasing force closing and maintaining the valve in the closed position, the safer the seal. However, because of the limited confines within which the valve/actuator must reside, and because of the low house pressures, prior art piston operated actuators are limited in the amount of biasing force which can be overcome by a single piston actuator.

SUMMARY OF THE INVENTION

The invention disclosed is a globe valve and actuator in combination. Because the combination disclosed provides redundant sealing means, the invention is particularly suited for use with caustic, corrosive or other environmentally hazardous substances. In particular, the invention can be used in conjunction with a various tanker transportation vehicles to reduce the potential for leakage while on or off loading hazardous substances, for instance chlorine. However, features of the invention are useful in other applications.

The invention incorporates a plurality of stacked pistons in the actuator. By stacking additional pistons within the actuator, the effect of low pneumatic house pressures can be overcome, allowing one to incorporate larger or additional springs to produce greater biasing forces and to maintain a valve/actuator combination sized to accommodate the space constraints imposed by transport tank use. In fact, by adding stacked pistons in the actuator, additional sealing means can be incorporated in the valve/actuator combination making for a safer pneumatically operated valves/actuator. Such additional sealing means include incorporation of a bellow-type seal around the valve stem and inclusion of packing devices around the valve stem. Prior to the use of stacked pistons, these additional sealing devices could not be utilized in low pressure pneumatically operated valves/actuators due to the additional forces that resulted from their incorporation. Finally, larger or a plurality of springs can be incorporated in the valve/actuator combination to produce greater closing force on the sealing surfaces of the valve, enhancing safety and allowing the sealing surfaces to be self-cleaning.

OBJECTS OF THE INVENTION

Accordingly, it is an object of the present invention to provide for a valve and actuator in combination using a plurality of stacked pistons.

It is another object of the invention to provide for a pneumatically driven valve and actuator in combination for use with normally available house pressures.

It is another object of the invention to provide for a pneumatically driven valve and actuator in combination for use on tanker transportation vehicles.

It is another object of the invention to provide for a pneumatically driven valve and actuator in combination for use on ISO tanks.

It is another object of the invention to provide for a pneumatically driven valve and actuator in combination for use on tanker vehicles transporting toxic or hazardous materials.

It is another object of the invention to provide for a valve and actuator with self-cleaning valve sealing surfaces.

It is another object of the invention to provide for a valve and actuator incorporating a multitude of sealing devices.

It is another object of the invention to provide for a valve and actuator having a bellows seal.

It is another object of the invention to provide for a valve and actuator using a series of chevron-style washers for packing.

It is another object of the invention to provide for easy access to a valve and actuator attached to a transport vehicle during loading or unloading.

BRIEF DESCRIPTION OF THE DRAWINGS

FIG. 9 is a perspective view of a barge tanker.

FIG. 10 is a perspective view of a truck tanker.

FIG. 13 is a cross sectional view of an embodiment of the invention.

DETAILED DESCRIPTION OF THE INVENTION

Figure 1:
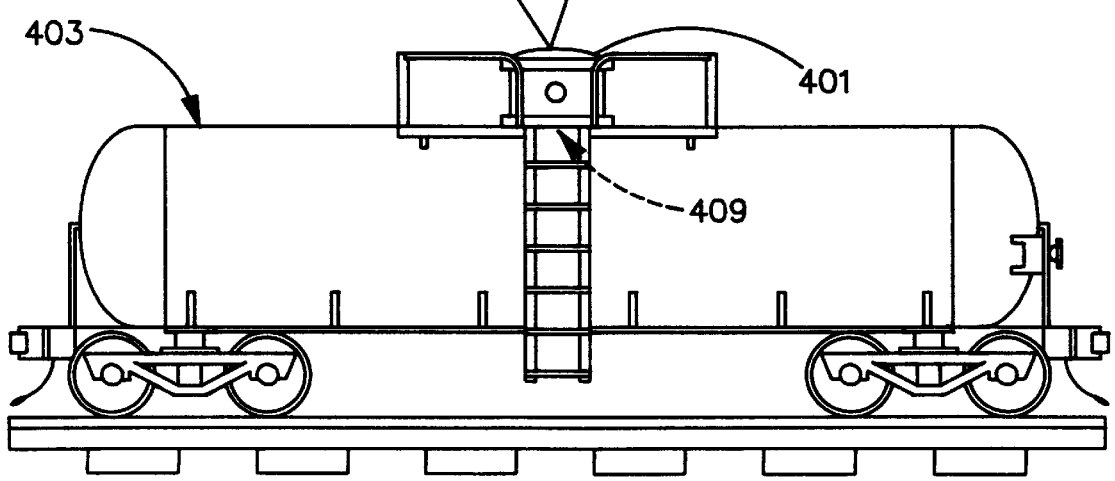
FIG. 1 is an elevation view of a tanker rail car with dome attached.

Turning to the drawings, FIG. 1 shows a tanker railcar 403. Standard tanker railcars 403 have an opening in the top of the tanker to access the interior of the car. FIG. 1 also shows railcar dome 401 attached to tanker railcar 403. Railcar dome 401 covers and protects equipment, such as valves, placed therein.

Figure 2:
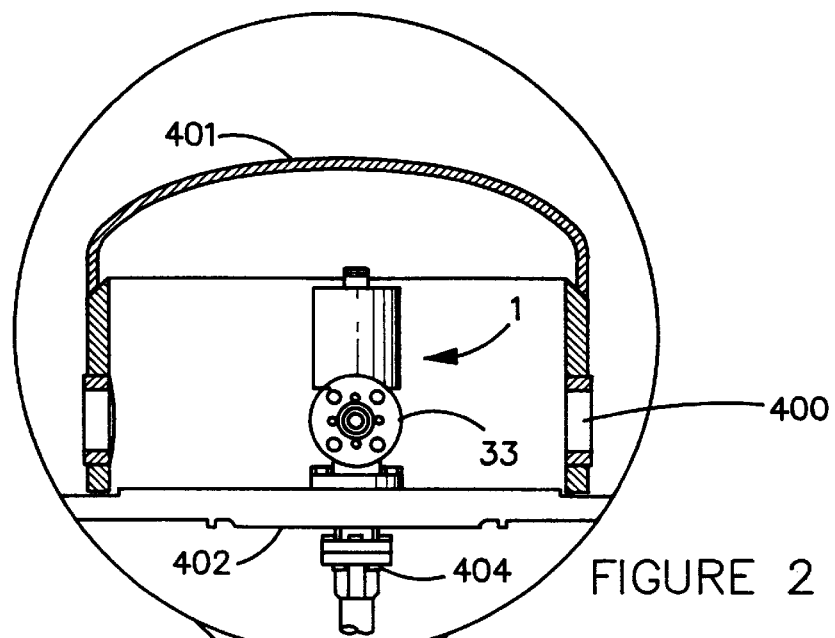
FIG. 2 is a cross-sectional view of a tanker railcar dome of a railcar such as shown in FIG. 1.

FIG. 2 shows a sectional view of an attached railcar dome 401. Shown are dome port openings 400 through the railcar dome 401. Dome port openings 400 allow restricted access to the valves positioned inside the railcar dome 401 without removal of the railcar dome 401 (top curved portion of dome 401 is hinged to bottom portion of dome 401, allowing access to the interior for repairs/replacements, etc.). Both the railcar dome 401 and dome port openings 400 are standard sizes as specified by the American Association of Railroads ("AAR"). Also shown is an attached valve and actuator in combination 1 mounted on a manway 402, and an end view of the outlet port extension 33. Outlet port extension 33 is more fully shown in FIGS. 6 and 7. Manway 402 is a standard cover for the opening in the top of the tanker railcar 403 (a "196 type" manway, as specified by the Chlorine Institute). Finally, FIG. 2 shows a check valve 404 mounted on the manway 402 and extending downwardly into the interior of the tanker railcar 403. Checkvalve 404 would remain in place in the event of an accident where railcar 403 derails and rolls, shearing off the railcar dome 401 and the valves inside the railcar dome 401.

Figure 3:
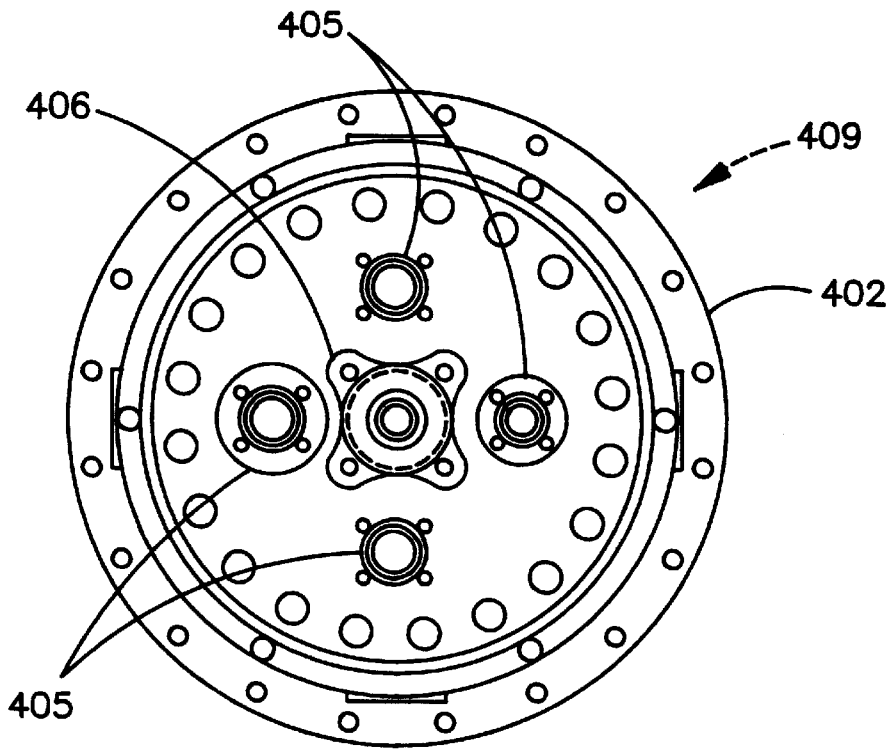
FIG. 3 is a top view of a manway cover of a railcar.
Figure 4:
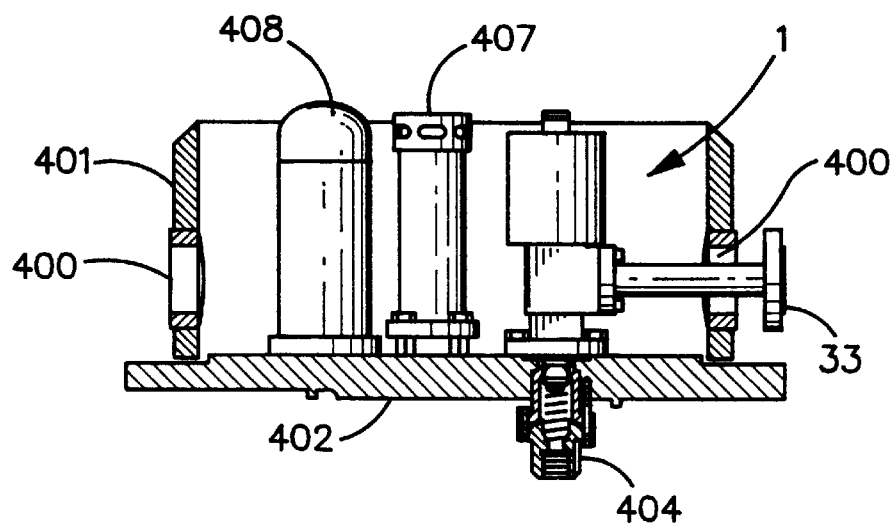
FIG. 4 is a partial cross sectional view of a tanker railcar dome at a 90 degree angle from that shown in FIG. 2.

FIG. 3 is a top view of a manway 402. Manway 402 has four attachment slots 405 to any one of which a valve and actuator in combination 1 can be attached. Also shown is a safety release valve seat 406 for attachment of a safety release valve 407. FIG. 4 shows is a partial cross section through an attached railcar dome 401 showing the manway 402, a cross section through a valve and actuator in combination 1, a bleeder valve 407 and an emergency hood 408. Emergency hood 408 is of standard size as specified by the Chlorine Institute for Emergency Kit "C", 6A Hood. Emergency hood 408 is designed to be installed over and seal and isolate a leaking valve and actuator in combination 1. The emergency hood 408 thus allows a leak to be isolated and the tanker railcar to remain in service. Thus, it is essential for a new design for a valve and actuator in combination 1 be able to attach to the standard AAR manway and further, be sized to fit beneath a standard emergency hood 408.

Figure 12:
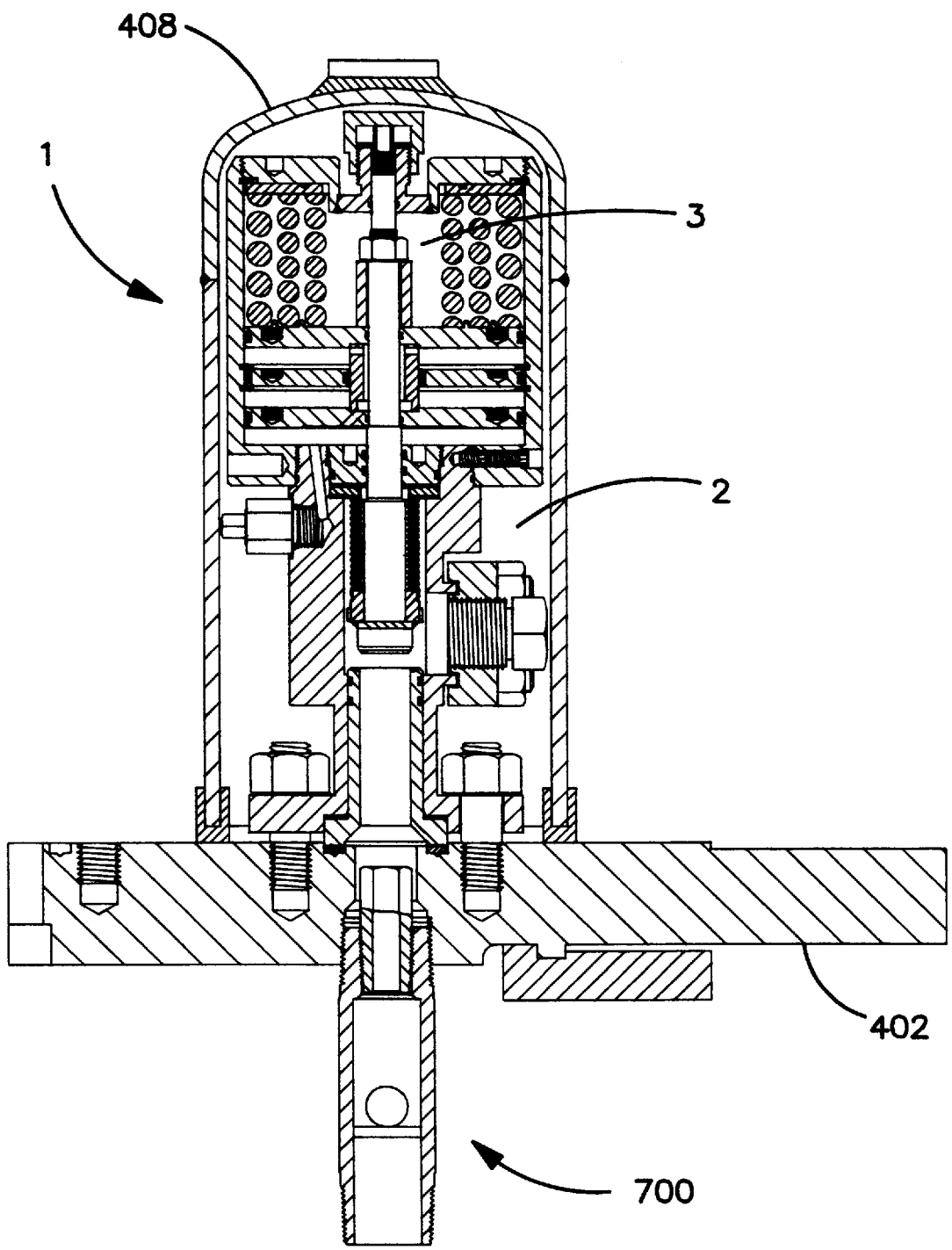
FIG. 12 is a perspective and cross sectional view of an embodiment of the invention.

A second type of manway cover is also standard in the industry, a "103 type" manway, as specified by the Chlorine Institute. Generally, the 103 type manway is similar to the 196 type manway, except the openings in the 196 type manway to which the valve body attaches are larger diameter openings than the 103 openings, (generally 196 manway openings are about 1.969 inches, while the 103 openings are about 1.495 inches at the top surface of the manway). Generally, manway 103 does not have an check valve attached to its underside, but instead, has attached an excess flow valve 700 as shown in FIG. 12. Generally, the excess flow valve is a ball type excess flow valve, as shown in FIG. 12, as opposed to a spring operated check valve of a globe type shown in FIG. 4.

Shown in FIG. 9A is a top view of a barge tanker 1000, pushed by tug 999. Barge tanker 1000 is a barge 1001 having storage for a multitude of tanks 1002 positioned therein. Shown are six tanks 1002 positioned longitudinally on the barge 1000 in two groups of 3. Also shown is catwalk 1004 positioned atop of each group of three tanks 1002, to provide access to the manways 402, and valves positioned thereon. Shown in FIG. 9B is a side view of the barge tanker 1000 showing the dome housing 1003 positioned atop each tank a typical manway. FIG. 9C is substantially identical to FIG. 4, and will be no longer discussed.

Shown in FIG. 10A is a side view of a truck tanker 1100, showing a truck 1101 and tank 1102. Shown atop tank 1102 is dome 1103 which is mounted on a manway 402 positioned atop tank 1102. FIG. 10B is a cross-section through dome 1103, and showing eductor pipes 1105 attached to two of the valve/actuators. Eductor pipes 1103 are connected to those valves used to onload or offload fluids, as opposed to gasses. Shown in FIG. 10C is a detailed cross section through dome 1103, and is substantially identical to FIG. 4, and will not be further discussed.

Figure 11A:
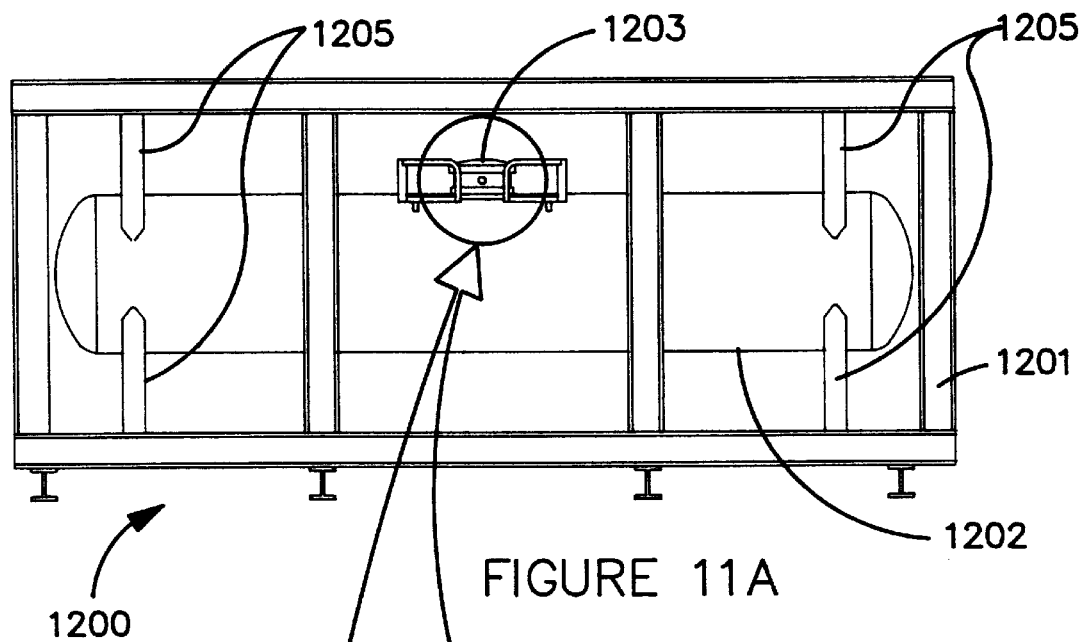
FIG. 11 is a perspective view of an ISO tank.
Figure 11B:
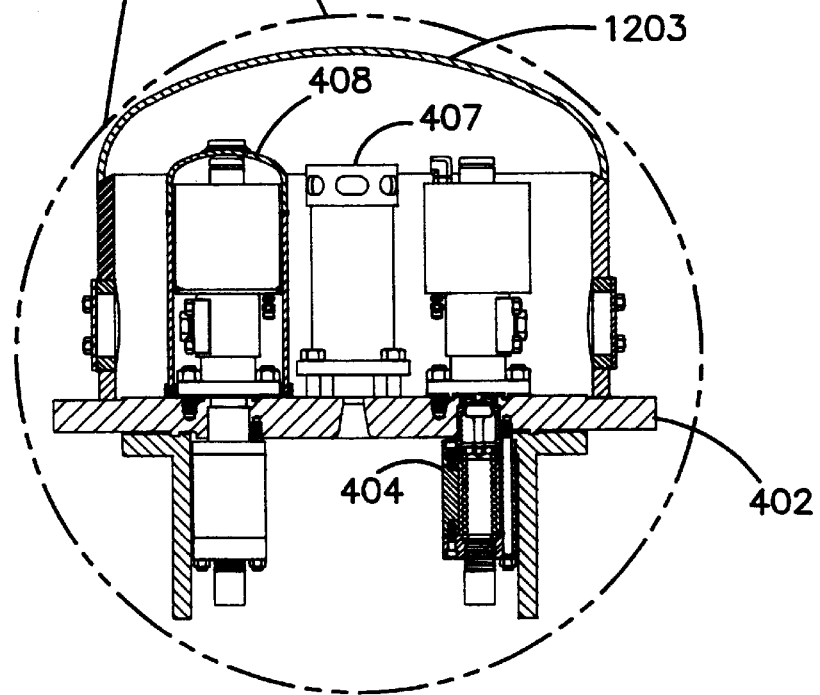

Shown in FIG. 11A is a side view of an ISO tank 1200. ISO tank has a tank 1202 and container 1201 for holding tank. Tank 1002 is supported in container 1201 by saddles 1204. Tank 1202 and container 1201 may be positioned on a flatbed for transport, or positioned on site for storage. Shown atop tank 1202 is dome 1203 which is mounted on a manway 402 positioned atop tank 1202. FIG. 11B is a cross-section through dome 1202, and is substantially identical to FIG. 4, and will not be further discussed.

Figure 5:
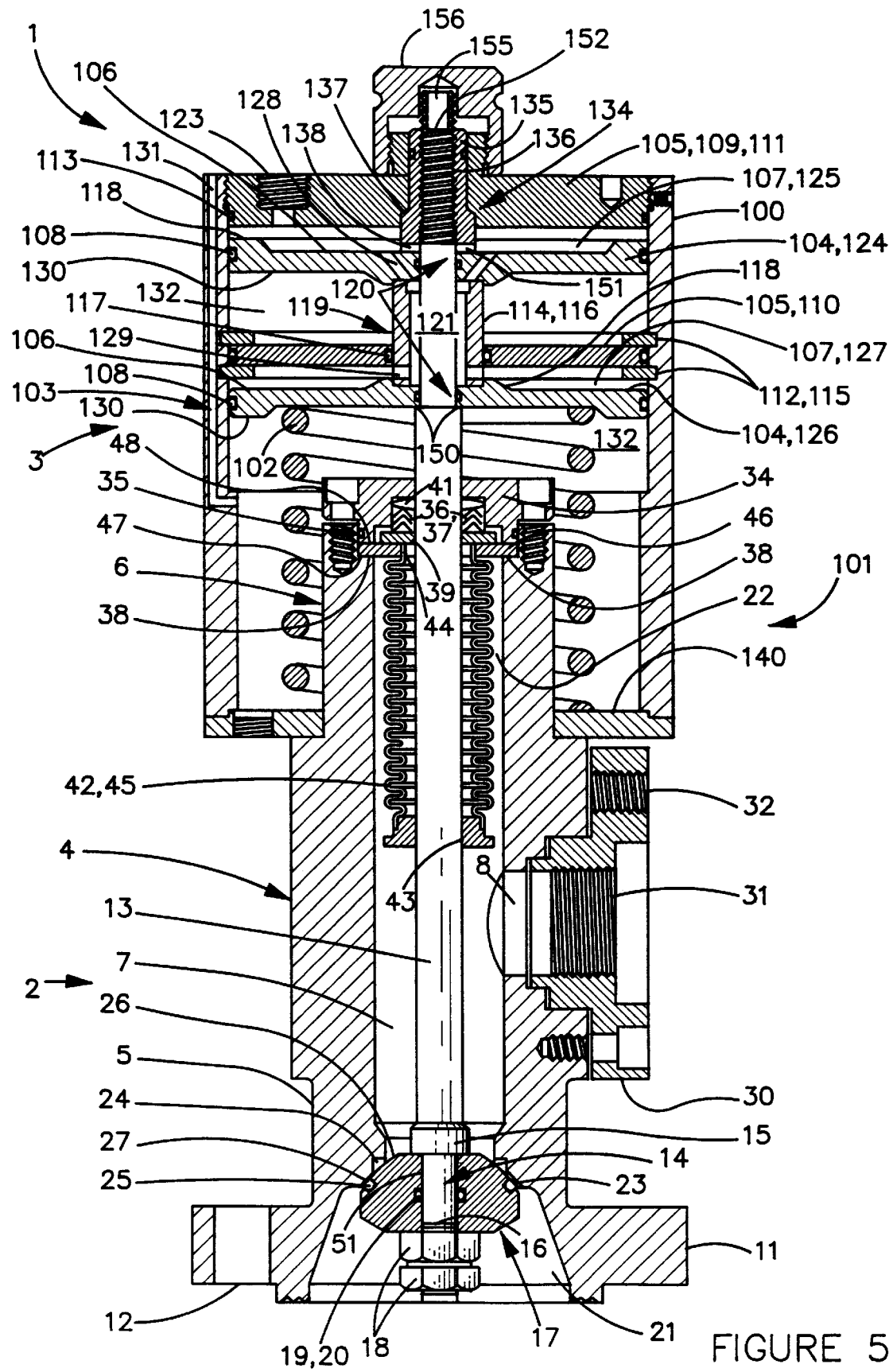
FIG. 5 is a cross sectional view of an embodiment of the invention.

Shown in FIG. 5 is one embodiment of the valve and actuator in combination 1, having a valve 2, and an actuator 3, generally for use with a manway having a check valve positioned on the interior of the tank. The valve 2 has a valve body 4, with a tank end 5, and a actuator end 6. A longitudinal bore through the valve body 4 forms a stem chamber 7. The end of the stem chamber 7 at the tank end 5 forms a seat port 21 and the end of the stem chamber 7 at the actuator end 6 forms an actuator port 22. A transverse bore through the valve body 4 located between the actuator port 22 and the seat port 21 forms an outlet port 8 in fluid communication with stem chamber 7. The tank end 5 also has an annular tanker flange 11 with manway bolt openings 12 positioned for bolting the valve body 4 to a Chlorine Institute standard manway 402.

A cylindrical valve stem 13 is slidably positioned in the stem chamber 7. Valve stem 13 has a plug end 14 having a plug shoulder 15 and threaded nipple section 16. Valve 2 further has a plug 17 attached to the valve stem 13. Plug 17 has a central core threadable on nipple section 16. Plug 17 is secured to valve stem 13 by plug nuts 18 (shown are two nuts, however one can be used). Plug 17 has a first plug O-ring 20 in a first annular recess 19 in the central core facing the valve stem 13. The first plug O-ring 20 seals plug 17 to valve stem 13. As an alternative to this plug O-ring 20, a face sealing O-ring could be placed between plug 17 and plug shoulder 15. Plug 17 has a second plug O-ring 27 in second annular recess 25 positioned on plug radiused shoulder 26 for sealing plug 17 against seat port 21.

Figure 8:
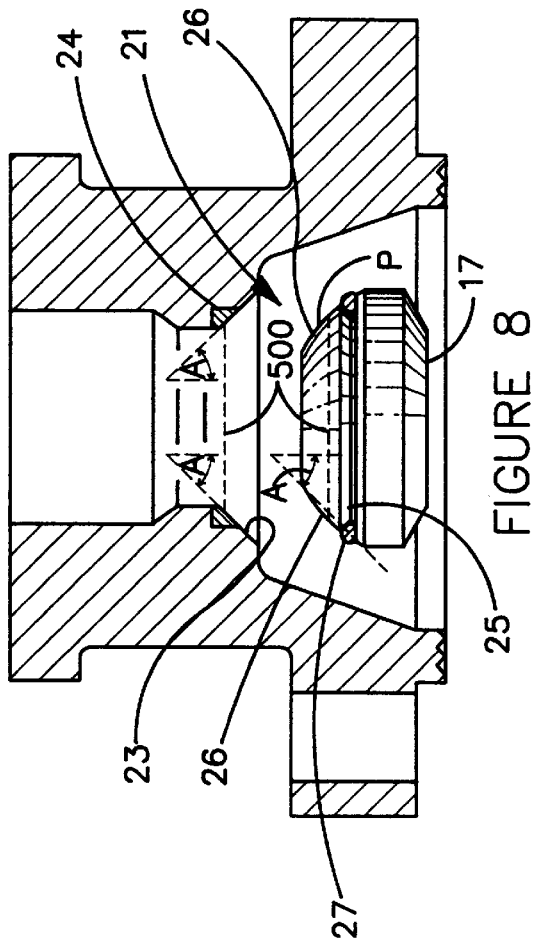
FIG. 8 is an exaggerated cross sectional view of the plug and valve seat illustrating the sealing area of the valve.

The flared opening of the seat port 21 terminates in a port shoulder 23, more fully shown in FIG. 8. The port shoulder 23 is recessed to receive a valve seat insert 24 (weld deposited onto shoulder). The valve seat insert 24 is preferably made of a material having a hardness in excess of the plug hardness. Stellite 21 (manufactured by Stoody Deloro Stellite Inc.) having a hardness range of 35–50 on the Rockwell C (Rc) scale has been used for the seat insert 24, and a plug material of hastelloy 276, having a hardness range of 25–30 Rc, has been used. When the valve 2 is closed, port shoulder 23 and plug radiused shoulder 26 are shaped to meet and seal on a circular sealing contact line 500 shown in FIG. 8.

Figure 6:
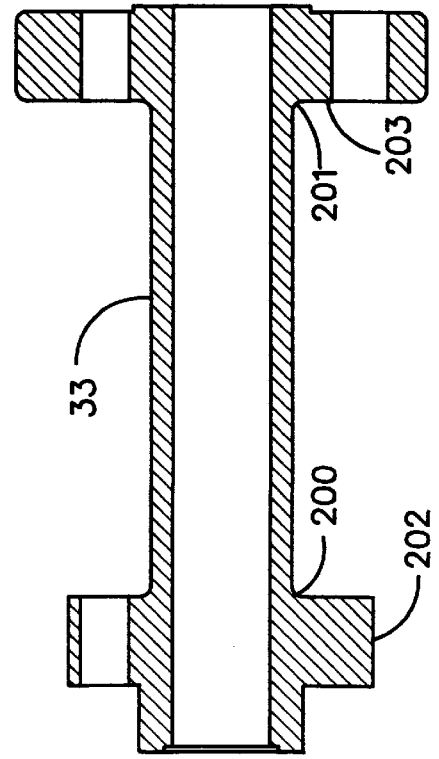
FIG. 6 is a lengthwise cross sectional view of the outlet port extension.

Attached to the outlet port 8 is an outlet flange 29. As shown in FIG. 5, outlet flange 29 is bolted onto valve body 4. Alternatively, threaded studs could be inserted into valve body 4, the outlet flange 29 then placed over studs and secured to valve body with nuts, as is suggested for the outlet flange shown in FIG. 12. Also, as shown in FIG. 13, valve body side of outlet flange 29 may be shaped to form a recess for a matching ridge on valve body 4, resulting in a tongue and groove relationship into which a gasket may be placed. As shown in FIG. 5, the outlet flange 29 has a threaded bore 31 for receiving a threaded pipe. Outlet flange 29 is easily replaced if the threads of the threaded bore 31 become damaged. Outlet flange 29 may also have a series of threaded openings 32 for attaching an outlet port extension 33, as shown in FIG. 6.

Valve stem 13 extends upwardly and exits the valve body 4 through the actuator port 22. Yoke 34 is sealingly attached to the valve body 4 near the actuator port 22, the valve stem 113 extending through yoke 34. Yoke 34 can be attached to valve body 4 with a variety of sealing means. As shown, yoke 34 is bolted to the valve body 4. Yoke 34 could also be threaded into valve body 4 (as is shown in FIG. 13). Yoke 34 has a yoke O-ring 35 facing the stem chamber 7. Yoke 34 may also have a packing means 36 for slidably sealing the yoke 34 to the valve stem 13. Packing means 36 may be an O-ring or a series of O-rings. As shown in FIG. 5, packing means 36 is a series of chevron-style washers 37 constructed of polytetrafluroethylene ("PTFE"). The chevron-style washers 37 bear, either directly or indirectly, against a surface on the valve body 4. Chevron washers 37 may bear directly on the valve body 7 by sitting on a bearing shoulder 38 in the valve body 2 (relationship not shown), or by sitting on a bearing flange 39, where the bearing flange 39 sits on the bearing shoulder 38 (relationship not shown). As shown in FIG. 5, chevron-style washers 37 bear against bearing flange 39, bearing flange 39 bears against bellows flange 46 which bears against bearing shoulder 38. When placed under a load occasioned by the torquing of yoke 34 attachment bolts, chevron-style washers 37 deform by flattening and sealing against valve stem 13. The load on the chevron-style washers 37 may be increased by incorporating a spring means 41, such as a spring clip or a crest washer, in the packing means 36. A PTFE gasket may be provided between bearing flange 39 and the surface on which bearing flange 39 seats.

Valve 2 may also incorporate a sealing shroud 42. Sealing shroud 42 has a stem end 43 attached to the valve stem 13 and a yoke end 44 connected to the valve body 4. Stem end 43 may be either fixedly attached (such as by seal welding, forming a seal around the joint) or threadably attached to valve stem 13. Yoke end 44 is connected to yoke 34 or stem chamber 7. FIG. 5 shows a sealing shroud 42 in the form of a bellows 45. Stem end 43 of bellows 45 is seal welded to valve stem 13, while yoke end 44 is seal welded to bellows flange 46. Bellows flange 46 bears on bearing shoulder 38, separated by a first gasket 47. Bearing flange 39 bears on bellows flange 46, separated by a second gasket 48. Preferably, first and second gaskets are composed of PTFE. Bellows 45 acts like a spring device by generating an upward restoration force when the bellows 45 is stretched, the restoration force opposing the stretching of the bellows 45.

The invention also has an actuator 3. Actuator 3 is a hollow body 100 having a valve end 101. Actuator 3 is joined to the valve body 2 near valve end 101. Actuator 3 and valve body 2 may be integrally joined by welding or threads. Valve end 101 forms a bearing surface 140 for a biasing means, such as helical coil spring 102, positioned in the hollow body 100. A plurality of piston assemblies 103 are stacked within hollow body 100. Each piston assembly 103 has a piston 104 slidable in piston chambers 132 in hollow body 100, and a partition 105 fixed in the hollow body 100. Pistons 104 have an upper face 106, and a lower face 130. The area between upper face 106 of the piston 104 and partitions 105 form actuator chambers 107. Shown in FIG. 5 are two such piston assemblies 103. Each upper piston face 106 has a shoulder section 118 to prevent actuation chambers 107 from fully closing. Alternatively, shoulder sections 118 could be provided on the partitions 105 to prevent the actuator chambers 7 from fully closing (not shown). First wall O-rings 108 form slidable seals between the pistons 104 and hollow body 100.

As shown in FIG. 5, first partition 109 is threaded into hollow body 100 to fix first partition position with respect to hollow body 100. First partition 109 thus forms end wall 111 of the actuator 3. End wall 111 and first piston 124 form first actuator chamber 125 therebetween in the hollow body 100. The second partition 110 is fixed to hollow body 100 by spiral rings 112, held in spiral ring recesses 115 in the hollow body 100. Second partition 110 and second piston 126 form second actuator chamber 127 therebetween in the hollow body 100. Second wall O-rings 113 seal partitions 105 against hollow body 100.

Pistons 104 are connected by rigid piston spacer 114. Piston spacer 114 may be a hollow collar 116 as shown, or a piston rod, a shoulder on one of the pistons 104, or any structure fixing the positions of pistons 104 with respect to each other so that pistons 104 move in unison. As shown, hollow collar 116 slidably extends through an aperture 119 in the second partition 110 and is slidably sealed against second partition 110 by collar O-ring 117.

Valve 2 and actuator 3 are operatively connected by joining valve stem 13 to pistons 104 so that valve stem 13 and pistons 104 move in unison. Piston O-rings 122 seal pistons 104 to valve stem 13. Valve stem 13 has a piston shoulder 150 upon which lower face 130 of second piston 126 bears. Thus, when pistons 104 move downwardly, second piston 126 bears downward on piston shoulder 150, mechanically imparting a downward movement to valve stem 13 in unison with pistons 104. Upward movement of the pistons 104 is also mechanically transferred to valve stem 13. Preferably, pistons 104 have center apertures 120 which align with the central axis of the hollow collar 116 to form a rod chamber 121 therebetween through which valve stem 13 extends. End wall 111 has a central opening 134 and a sleeve 135 slidable in the central opening 134. The central opening 134 is aligned with valve stem 13. Sleeve 135 has a threaded bore 136 therethrough and a first lip section 137 for contacting the end wall 111 to restrain the upward movement of the sleeve 135 in the central opening 134. A second lip section 151 of the sleeve bears on upper face 106 of first piston 124. A lip gasket 138 is interposed between the second lip section 151 and the upper face 106 of first piston 124. Valve stem 13 has a threaded termination end 152 threadably inserted into threaded bore 136. Thus, when pistons 104 move upwardly, first piston 124 bears on second lip section 151 of sleeve 135 threadably attached to valve stem 13, thus imparting an upward movement to valve stem 13 in unison with pistons 104.

Actuator 3 also has a path means for introducing pressurized fluid into the actuator chambers 107. Preferably, path means includes a threaded nipple opening 123 in the end wall 111, the threaded nipple opening 123 fluidly communicating with the first actuator chamber 125; a series of fluid piston openings 128 through the first piston 124, the fluid pistons opening 128 fluidly communicating with the first actuator chamber 125 and the rod chamber 121; and a series of fluid collar openings 129 in the hollow collar 116; the fluid collar openings 129 in fluid communication with the rod chamber 121 and the second actuator chamber 127. Alternatively, path means could include bores in the walls of the hollow body 100 fluidly connecting the first actuator chamber 125 with the second actuator chamber 126 (not shown).

In operation, helical coil spring 102 applies an upward biasing force against second piston 126, which force is transmitted to the operationally connected valve stem 13 to close the valve 2. To open the valve 2, pressurized fluid is introduced into the first actuator chamber 125 through the threaded nipple opening 123. Pressurized fluid flows from first actuator chamber 125 into fluid piston opening 128 through first piston 124, into rod chamber 121 in the hollow collar 116, out of fluid collar openings 129 into second actuator chamber 127. The pressurized fluid in actuator chambers 107 exerts a force on piston upper faces 106 opposing the bias force of helical coil spring 102 sufficient to overcome the bias force of helical coil spring 102, the restoration force of the bellows 47, and the frictional forces generated by the various O-rings and packing means 36 moving pistons 104, valve stem 13 and plug 17 downward, thereby opening valve 2. As plug 17 moves further downward (about ⅛ inch) plug 17 contacts check valve 404. Upon continued downward movement (about ½ inch) of plug 17, check valve 404 opens, thus providing access to tank interior.

Actuator 3 may also have a backup mechanical means for operating the valve 2. The backup means shown in FIG. 5 is provided by a protrusion section 155 of termination end 152 of valve stem 13 which extends through the end wall 111. Bearing down on protrusion section 155 with a suitable means mechanically opposes the bias force of helical coil spring 102, moving valve stem 13 downward and thus opening valve 2. To protect the protrusion section 155, an end cap 156 for covering the protrusion section 155 may be threadably attached to the end wall 111.

Also shown in FIG. 5 are vent bores 131. Vent bores 131 allow piston chambers 132 to fluidly communicate with the atmosphere to prevent pressure build up in the piston chambers 132 as the actuator chambers 107 expand. Actuator 3 may also include a bleed valve for bleeding the pistons chambers 132. Finally, an angled nipple may be attached to the threaded nipple opening 123.

Shown in FIG. 6 is a cross section through outlet port extension 33. Outlet port extension has a port end 200 and a distal end 201. Attached to port end 200 is an attachment segment, such as port end flange 202, to attached the outlet port extension 33 to outlet port 8 or to outlet flange 30 inserted in outlet port 8. As shown in FIG. 6, port end flange 202 is equipped with a series of holes therethrough for attachment. Port end flange 200 is sized to fit through the standard sized dome port opening 400 on a tanker railcar dome 401.

Figure 7:
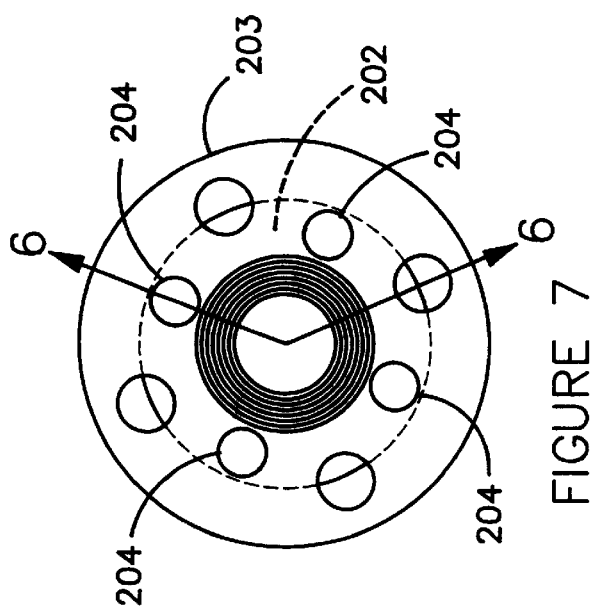
FIG. 7 is an end view from the distal end of the outlet port extension.

Outlet port extension 33 is of sufficient length to allow distal end 201 to project through the dome port opening 400 when the outlet port extension 33 is attached to outlet port 8 on valve body 4 attached to the manway 402 covered with railcar dome 401. Attached to distal end 201 is a flange means, such as distal end flange 203. FIG. 6 shows distal end flange 203 as integral with outlet port extension, but this is not necessary. Distal end flange 203 could have a center threaded bore for threading onto matching male threads on distal end 201 of outlet port extension 33 (not shown). Any flange means attached to distal end 201 must allow the attachment segment on the port end 200 to be attached to outlet port 8 or outlet flange 30 through dome port opening 400. One means is for distal end flange 203 to have a series of alignment openings 204 through the distal end flange 203 as is shown in FIG. 7. In this fashion, outlet port extension 33 may be inserted into outlet port 8 through dome port opening 400 and the connection means, such as bolts or nuts attached to studs in valve body (not shown in FIG. 5, but shown in FIG. 13), for attaching port end flange 202 may be attached through the alignment openings 204 in the distal end flange 203. It is not possible to attach outlet port extension 33 in this fashion when the outlet flange 30 is attached to valve body 4 by way of studs and nuts (as Shown in FIG. 12); in this instance, to attach outlet port extension 33, the hinged top of dome must opened, allowing access to the nuts holding outlet flange 30 onto valve body; the nuts are then removed, the extension 33 placed over the studs, and the nuts replaced, thus securing outlet port extension 33 to valve body 4.

FIG. 8 shows an exaggerated view of the plug 17, plug radiused shoulder 26, port shoulder 23 and valve seat insert 24. Plug radiused shoulder 26 is a curved surface of tangent angle A as shown in FIG. 8, that curved surface having a curvature of radius of curvature P. Seat shoulder is an angular surface of angle A having no curvature. Because of the differences in curvature, when valve 2 is closed, the plug radiused shoulder 26 contacts the port shoulder 23 on a circular sealing contact line 500. Because the contact between plug 17 and seat port 21 is a single line, the plug 17 is self-centering upon closing, thereby reducing the need for critical tolerances in the machining of the two contacting surfaces to create a proper seal. Valve seat insert 24 is positioned on the port shoulder 23 so that circular sealing contact line 500 is contained within valve seat insert 24. Valve seat insert 24 (as shown as an inlay) preferably is of a material having a hardness in excess of the plug hardness. Stellite 21, having a hardness range of 35–50 on the Rockwell C (Rc) scale, has been used for the seat insert, and a plug material of hastelloy 276, having a hardness range of 25–30 Rc, has been used. Due to the greater spring strengths that can be used in this invention, the valve 1 can close with greater speed and force than those previously known. Upon closure, valve seat insert 24 will act as a knife edge shearing off any deposits that otherwise might have built up on circular sealing contact line 500. As shown, plug 17 has a second plug O-ring 27 located in a second plug recess 25. Second plug O-ring 27 is interposed on plug radiused shoulder 26 between the circular sealing contact line 500 and plug nuts 18. Second O-ring 27 provides a second seal between the plug 17 and the port shoulder 23, providing the valve 2 with sealing redundancy.

Shown in FIG. 13 is another embodiment of the valve and actuator in combination 1, having a valve 2, and an actuator 3, generally for use with a "103 type" manway having an excess flow valve positioned in the interior of the tank, as shown in FIG. 12. As seen, this embodiment includes a biasing means to close valve, but in this case, biasing force is directed downward toward the valve seat, while in the previous embodiment, the biasing means generated a force directed upward towards the valve seat.

The valve 2 has a valve body 4, with a tank end 5 and a actuator end 6. Actuator end 6 has external threads 200 to matingly engage with threads 20 on the valve end of the actuator 3, allowing easily assembly of valve body 4 with actuator 3. A longitudinal bore through the valve body 4 forms a stem chamber 7. The end of the stem chamber 7 near the tank end 5 forms a seat port 21 and the end of the stem chamber 7 near the actuator end 6 forms an actuator port 22. A transverse bore through the valve body 4 located between the actuator port 22 and the seat port 21 forms an outlet port 8 in fluid communication with stem chamber 7. The tank end 5 also has an annular tanker flange 11 with manway bolt openings 12 positioned therein for bolting the valve body 4 to a manway 402.

Positioned in seat stem chamber 7 at tank end 5 is annular seat insert member 242 having a longitudinal bore therethrough. Seat insert member 242 has a tank end 242A and a actuator end 242B. Gasket means 244 may be interposed between tanker flange 11 and seat insert member 242 (shown as an inlay). Actuator end 242B forms a seat 90 for the plug 17 positioned on valve stem 13. Actuator end 242B is radiused to accept an inlay of hardened seat material, preferably made of a material having a hardness in excess of the plug hardness. Stellite 21 (manufactured by Stoody Deloro Stellite Inc.) having a hardness range of 35–50 on the Rockwell C (Rc) scale has been used for the seat insert 24, and a plug material of hastelloy 276, having a hardness range of 25–30 Rc, has been used. Note that the hardened material could also be placed on the plug 17 of valve stem 13. However, an advantage of placing the hardened material on the valve seat 90 on seat insert member 242, is that if the seat 90 becomes damaged, the seat 90 is readily replaceable by replacing seat insert member 242.

Also shown is air inlet 201, a threaded opening in the valve body 4 fluidly communicating with air passageway 202. Air passageway 202 is fluidly connected to first actuator chamber 107 as later described. Air inlet 201 is designed to accommodate a threaded insert (not shown). The threaded insert is designed to accept an air hose fitting for connection to an air hose, generally the threaded insert is internally threaded with pipe threads. The threaded insert is easily replaced if the internal threads of the insert are damaged by the air hose fitting. When not in use, air inlet 201 can be sealed with an air inlet plug, generally a plug with male pipe threads (not shown).

Attached to the outlet port 8 is an outlet flange 30. Outlet flange 30 is attached to valve body 4 over studs in valve body 4. The outlet flange 30 has a threaded bore 31 for receiving a threaded pipe, generally, threaded bore is pipe threaded to provide a fluid tight seal when in use. Outlet flange 30 is easily replaced if the threads of the threaded bore 31 become damaged. When not in use, threaded bore 31 may be plugged with an outlet plug. Positioned between outlet flange 30 and valve body 4 is a suitable gasket.

Slidably positioned in stem chamber 7 is cylindrical valve stem 13. Valve stem 13 has a plug end 14 and actuator end 34. Valve 2 further has a plug 17 attached to the valve stem 13 at plug end. As shown in FIG. 13, plug 17 has a male threaded end 217 threadable into the base of valve stem 13. Once threaded into stem 13, the plug 17 is welded to valve stem 14. Shown are two embodiments of plug: 17 and 17a. Plug 17 is constructed of a metal softer than that of the valve seat 90, but resistant or inert to chemical attack by the substance in the tank. Materials such as monel, stainless steel or hastelloy are suitable. Plug 17 has a curved surface so that when engaged against valve seat, contact occurs substantially along a circumferential line of plug 17, much like that shown in FIG. 8. Plug 17b is a laminate structured plug a having an annular base plate 209 with a center opening for screw or bolt 214. Base plate is a metal inert to the materials in the tank (such as hastelloy), and has a recessed area 211 for holding a sealing material 212, such as a carbon and glass fiber filled PTFE. Sealing material 212 will sealingly mate against valve seat 90 when the valve 2 is closed. Sealing material 212 is held in recessed area 211 by a retainer cap 213 and a retainer screw 214 which inserts through center opening in base plate 209 and is threaded into valve stem 13. Generally, base plate 209 will be welded onto valve stem 13, but retainer screw 214 may still be removed, allowing the seating material 212 to be replaced as needed.

Valve stem 13 extends upwardly and exits the valve body 4 through the actuator port 22. Yoke 34 is sealingly attached to the valve body 4 near the actuator port 22, the valve stem 13 extending through yoke 34. Yoke 34 can be attached to the valve body 4 with a variety of sealing means. As shown in FIG. 5, yoke 34 is threaded into the valve body 4. Yoke 34 has yoke O-rings 35 facing the stem chamber 7 forming a packing means to seal around the valve stem 13, and also has an O-ring facing the valve body 4.

Valve 2 may also incorporate a sealing shroud 42. Sealing shroud 42 has a stem end 43 attached to the valve stem 13 and a yoke end 44 connected to the valve body 4. Stem end 43 is fixedly attached to valve stem 13 by seal welding. Yoke end 44 is joined to stem chamber 7. FIG. 13 shows a sealing shroud 42 in the form of a bellows 45. Stem end 43 of bellows 45 is seal welded to valve stem 13, while yoke end 44 is seal welded to bellows flange 46. Bellows flange 46 bears on bearing shoulder 38 of valve body 4, separated by a first gasket 47. A second gasket 48 separates yolk 34 and bellows flange 45. Bellows 45 acts like a spring device by generating an upward restoration force when the bellows 45 is stretched, the restoration force opposing the stretching of the bellows 45. Stem end 43 of sealing shroud 42 may have a series of vertical flutes cut in the exterior (not shown) to ensure that the portion of stem chamber 7 above stem end 43 is in fluid communication with the portion of stem chamber 7 below stem end 43, thus preventing gasses or fluids from being trapped above sealing shroud 42 and generating a compression force resisting the upward movement of the sealing shroud 42.

The invention also has an actuator 3. Actuator 3 is a hollow body 100 having a valve end 101. Actuator 3 is joined to the valve body 2 near valve end 101. Actuator 3 and valve body 2 may be removably separable pieces as is shown in FIG. 13, or integrally joined, such as by welding. As shown in FIG. 13, actuator has threaded opening 501 for set screw to fix actuator 3 to valve body 4. Other openings are shown in actuator walls for engagement of a spanner wrench to assist in assembly of actuator 3 with valve body 4.

A plurality of piston assemblies 103 are stacked within hollow body 100. Each piston assembly 103 has a piston 104 slidable in piston chambers 132 in hollow body 100, and a partition 105 fixed in the hollow body 100. Pistons 104 have an upper face 106, and a lower face 130 (as shown in FIG. 13, the upper faces 106 of pistons 104 are facing a downward direction). The area between upper face 106 of the piston 104 and partitions 105 form actuator chambers 107. Shown in FIG. 13 are two such piston assemblies 103.

As shown in FIG. 13, first partition 109 is an integral end wall 111 of hollow body 100. End wall 111 and first piston 124 form first actuator chamber 125 therebetween in the hollow body 100. The second partition 110 is an annular disk fixed to hollow body 100 by spiral rings 112, spiral rings 112 being held in ring recesses 115 in the hollow body 100. Second partition 110 and second piston 126 form second actuator chamber 127 therebetween in the hollow body 100. As shown, pistons 126, 125 and partition 110 have a series of threaded openings positioned thereon to assist in installation and removal.

Pistons 104 are connected by rigid piston spacer 114. Piston spacer 114 may be a hollow collar 116 as shown, or a piston rod, a shoulder on one of the pistons 104, or any structure fixing the positions of pistons 104 with respect to each other so that pistons 104 move in unison. As shown, hollow collar 116 slidably extends through an aperture 119 in the second partition 110 and is slidably sealed against second partition 110 by an O-ring.

Valve 2 and actuator 3 are operatively connected by joining valve stem 13 to pistons 114 so that valve stem 13 and pistons 104 move in unison. Piston O-rings 122 seal pistons 104 to valve stem 13. Valve stem 13 has a piston shoulder 150 upon which upper face 106 of first piston 124 bears. Positioned on lower face 130 of second piston 126 is annular collar 310, through which valve stem 13 extends. Valve stem 13 is threaded adjacent to annular collar 310 to accept a nut 311. When snugged down, nut 311 operatively joins valve stem 13 and pistons 104 into a single moveable unit. Thus, when pistons 104 move downwardly, first piston 124 bears downward on piston shoulder 150, mechanically imparting a downward movement to valve stem 13 in unison with pistons 104; upward movement of the pistons 104, similarly, imparts an upward against nut 311, thus mechanically imparting upward movement to valve stem 13.

Actuator 3 also has a path means for introducing pressurized fluid into the actuator chambers 107. As shown, first piston 124 has a series of center apertures 120 therethrough in fluid communication with the first actuator chamber 125, and which center apertures 120 align with the central axis of the hollow collar 116 to form a rod chamber 121 therebetween. The valve stem 13 extends through the rod chamber 121. The path means includes a series of fluid collar openings 129 in the hollow collar 116; the fluid collar openings 129 in fluid communication with the rod chamber 121 and the second actuator chamber 127. Alternatively, path means could include a bore in the walls of the hollow body 100 fluidly connecting the first actuator chamber 125 with the second actuator chamber 126 (not shown).

Also shown in FIG. 13 are vent bores 131. Vent bores 131 allow piston chambers 132 to fluidly communicate with each other. Second piston chamber 135 is sufficiently large to act as a holding chamber for gasses from first piston chamber 137 as both chambers compress without resulting in a significant back pressure build up in the second piston chamber 135. While vent bores 131 could vent to the atmosphere, such venting may present the opportunity for harmful vapors (such as water vapors) to enter actuator chambers.

At the top of hollow body is positioned upper spring seat 250, held in place by annular spiral retainer ring 252. Positioned atop upper spring seat 250 is actuator top cover 260. Actuator top cover 260, as shown, is a two piece structure, an outer annulus 261 and an inner annulus 262. The outer annulus 261 is threaded into the inner wall of hollow body 100, while the inner annulus 262 is welded to the outer annulus 261. The outer portion of inner annulus 262 is a recessed area with respect to the top surface of the actuator 3 area, forming a depressed flat 270. The inner portion of the inner annulus 262 is an upwardly projecting cylindrical body 280, which is threaded on the exterior surface. Valve stem 13 extends through the cylindrical body 280 of inner annulus 262.

Disposed in second piston chamber 135 are a series of biasing means, shown as helical coil springs 102. Three such springs are shown disposed in first actuator chamber. In one embodiment, coils of the following strengths were used (in order of outside to inside springs): 650 lbs, 450 lbs, 280 lbs (1380 lbs combined). It is preferred that adjacent springs 102 be wound in opposite directions, lessening the possibility of adjacent springs becoming entangled with each other. Also shown are two raised annular projections 99 on the lower face 130 of second piston 126. These raised annular projections 99 are to keep the series of coils 102 from becoming entangled.

Top of valve stem 13 is threaded and extends above cylindrical body 280 of inner annulus 262. Shown as FIG. 13A is transport cap 290, which is a threaded cap adapted to mate with treads on upstanding cylindrical body 280. In use, transport cap 290 is placed on cylindrical body 280, and screwed down until transport cap 290 contacts the end of the valve stem 13 which projects above cylindrical body 280, such contact preventing valve stem 13 from accidentally moving upward and opening during transportation.

In operation, helical coil springs 102 applies a downward biasing force against second piston 126, which force is transmitted to the operationally connected valve stem 13 to close the valve 2. To open the valve 2, pressurized fluid is introduced into the first actuator chamber 125 through the threaded nipple opening 123. Pressured fluid flows from first actuator chamber 125 into fluid piston opening 128 through first piston 124, into rod chamber 121 in the hollow collar 116, out of fluid collar openings 129 into second actuator chamber 127. The pressurized fluid in actuator chambers 107 exerts a force on piston upper faces 106 opposing the biasing force of helical coil springs 102 sufficient to overcome the biasing force of helical coil springs 102, the restoration force of the bellows 47, and the frictional forces generated by the various O-rings and packing means 36 thereby moving pistons 104, valve stem 13 and plug 17 upward and opening valve 2.

Valve/actuator combination also may have a backup mechanical means for operating the valve 2. The backup means shown in FIG. 13B is provided by a manual operating cap 300. Manual operating cap 300 has a center hole 301 therethrough which is threaded to match the thread end of valve stem 13 which protrudes through the cylindrical body 280. In operation, manual operating cap 300 is threaded onto valve stem 13 and turned until end walls 302 of cap 300 bear on flat 270 of inner annulus 262. Continued turning of cap 300 will thus result in raising valve stem 13 and opening valve 2.

Choice of materials for construction will depend upon the nature of the materials intended to flow through valve and should be apparent to those skilled in the art. Materials in contact with the flowing materials should be inert to those materials. For instance, for corrosive materials, it may be desirable to construct valve body 4 from stainless steel, and valve stem 13 and bellows 42 from stainless steel or hastelloy (such as Hastelloy 276). For non-corrosive application, carbon steel may be sufficiently durable. In instances where the air supply may be contaminated with water, it may also be desirable to have hollow body 100, springs 102, pistons 104 and partitions 105 constructed from stainless steel. Gasket materials, such as O-rings, should also be inert to the materials flowing through the valve. Fluorocarbon materials may be appropriate (such as Viton, available from Dupont), PTFE, or carbon and glass filled PTFE may be suitable. PTFE, however, has a tendency to "cold flow" under pressure, and if used, it may be desirable to include serrated edges or ridges on the surfaces against which the PTFE bears to help resist "cold flow." Other suitable gasket materials may include compressed asbestos, such as chrysotile asbestos, available as Garlock 900 from Garlock, Inc., and nitrile, available as BUNA-N from Dupont.

The two embodiments shown have different features demonstrating alternate means of accomplishing the desired task, and it is possible to combine or replace features of one embodiment with features of the other embodiment.

The valves/actuators shown are easily assembled, and have redundant seals to prevent leakage through the valve/actuator.

We claim:

1. In combination with a transportable tank having an opening in said tank, a manway attached to said opening, said manway having a port therethrough, said manway having attachment points to attach at least one emergency hood for sealingly isolating said port, a valve and actuator in combination attached to said port, said valve and actuator comprising:
   (A) a valve having
      (i) a valve body having a tank end attached to said manway;
      (ii) a valve seat positioned in said valve body near said tank end, said valve seat having a valve sealing surface;
      (iii) a stem chamber extending through said valve body, said stem chamber having an actuator port, a seat port, and an outlet port, said seat port, said actuator port and said outlet port fluidly communicating with said stem chamber, said seat port positioned near said tank end, said outlet port positioned between said actuator port and said seat port;
      (iv) a valve stem slidably positioned in said stem chamber, said valve stem having a plug end; and
      (v) a plug attached to said plug end of said valve stem, said plug having a plug sealing surface adapted to sealingly contact said valve sealing surface of said valve seat;
   (B) an actuator having
      (i) a hollow housing having an valve end, said valve end fixedly connected to said valve body;
      (ii) a plurality of piston assemblies, each of said piston assemblies having
         (a) a piston slidable in said housing, each of said pistons having an upper face;
         (b) a partition in said housing sealingly fixed in position relative to said housing, said upper face of said piston and said partition defining an actuator chamber therebetween;
      (iii) piston spacers joining said pistons so that each of said pistons is fixed in position with respect to the others, said pistons further being operatively joined to said valve stem so that said valve stem is fixed in position relative to said pistons;
      (iv) biasing means for generating a biasing force to bias said plug sealing surface against said valve seat sealing surface thereby closing said valve; and
   (C) a path means for introducing pressurized fluid into said actuator chambers so that said pressurized fluid exerts a force against each of said upper faces of said pistons in opposition to said biasing force;
   said valve and said actuator sized to fit within an emergency hood when attached to said manway.

2. A device according to claim 1 wherein said transportable tank is a tanker railcar, a barge tank, an ISO tank, or a truck tanker.

3. A device according to claim 1 wherein said biasing force is directed away from said plug end of said valve stem.

4. A device according to claim 1 wherein said biasing force is directed toward said plug end of said valve stem.

5. A combination according to claim 1 wherein said valve body further comprises
   (v) a yoke, said valve stem extending slidably through said yoke, said yoke further having a packing means to form a seal between said yoke and said valve stem, said valve stem, said yoke and said packing means fluidly sealing said actuator port of said stem chamber.

6. A combination according to claim 5 wherein said packing means comprises a series of polytetrafloruethylene chevron style washers and a spring means for biasing said chevron washers.

7. A combination according to claim 1 wherein said value further comprises a sealing shroud member positioned in said stem chamber, said valve stem extending through said sealing shroud, said sealing shroud having a yoke end and a stem end, said yoke end being sealingly connected to said stem chamber above said outlet port, said stem end of said sealing shroud being sealingly connected to said plug end of said valve stem.

8. A combination according to claim 4 wherein said sealing shroud member comprises a bellows.

9. A combination according to claim 1 wherein said valve further has an outlet flange attached to said outlet port.

10. A combination according to claim 1 wherein said plug sealing surface has an annular band of material having a hardness greater than that of said valve sealing surface.

11. A combination according to claim 1 wherein said valve sealing surface has an annular band of material having a hardness greater than that of said plug sealing surface.

12. A valve and actuator in combination comprising:
   (A) a valve having
      (I) a valve body having a tank end attachable to a manway;
      (ii) a valve seat positioned in said valve body near said tank end, said valve seat having a valve sealing surface;
      (iii) a stem chamber extending through said valve body, said stem chamber having an actuator port, a seat port, and an outlet port, said seat port, said actuator port and said outlet port fluidly communicating with said stem chamber, said seat port positioned near said tank end, said outlet port positioned between said actuator port and said seat port;
      (iv) a valve stem slidably positioned in said stem chamber, said valve stem having a plug end; and
      (v) a plug attached to said plug end of said valve stem, said plug having a plug sealing surface adapted to sealingly contact said valve sealing surface of said valve seat;

(B) an actuator having
- (I) a hollow housing having a valve end, said valve end fixedly connected to said valve body;
- (ii) a plurality of piston assemblies, each of said piston assemblies having
  - (a) a piston slidable in said housing, each of said pistons having an upper face and a lower face;
  - (b) a partition in said housing sealingly fixed in position relative to said housing, said upper face of said piston and said partition defining an actuator chamber therebetween;
  - (c) a piston chamber adjacent to said lower face of said piston
- (iii) piston spacers joining said pistons so that each of said pistons is fixed in position with respect to the others, said pistons further being operatively joined to said valve stem so that said valve stem is fixed in position relative to said pistons;
- (iv) biasing means for generating a biasing force to bias said plug sealing surface against said valve seat sealing surface thereby closing said valve; and (C) a path means for introducing pressurized fluid into said actuator chambers so that said pressurized fluid exerts a force against each of said upper faces of said pistons in opposition to said biasing force.

13. A valve and actuator in combination according to claim 12 wherein said valve further has:
- (vi) a yoke, said valve stem extending slidably through said yoke, said yoke further having a packing means to form a seal between said yoke and said valve stem, said valve stem, said yoke and said packing means fluidly sealing said actuator port of said stem chamber.

14. A valve and actuator in combination according to claim 12 wherein said valve further has:
- (vi) a sealing shroud member positioned in said stem chamber, said valve stem extending through said sealing shroud, said sealing shroud having a yoke end and a stem end, said yoke end being sealingly connected to said stem chamber above said outlet port, said stem end of said sealing shroud being sealingly connected to said plug end of said valve stem.

15. A valve and actuator in combination according to claim 13 wherein said valve further has:
- (vii) a sealing shroud member positioned in said stem chamber, said valve stem extending through said sealing shroud, said sealing shroud having a yoke end and a stem end, said yoke end being sealingly connected to said stem chamber above said outlet port, said stem end of said sealing shroud being sealingly connected to said plug end of said valve stem.

16. A valve and actuator in combination according to claim 12 wherein said biasing means is a spring.

17. A valve and actuator in combination according to claim 12 wherein said biasing force is directed toward said plug end of said valve stem.

18. A valve and actuator in combination according to claim 12 wherein said biasing force is directed away from said plug end of said valve stem.

19. A valve and actuator in combination according to claim 14 wherein said sealing shroud comprises a bellows.

20. The device according to claim 12 wherein said valve further has a seat insert member positioned in said stem chamber of said valve, said valve sealing surface positioned on said seat insert member.

* * * * *